United States Patent

Takano

[11] Patent Number: 5,977,508
[45] Date of Patent: Nov. 2, 1999

[54] RESISTANCE WELDING METHOD AND APPARATUS USED IN THE METHOD

[75] Inventor: Yukinori Takano, Shizuoka, Japan

[73] Assignee: Yazaki Corporation, Tokyo, Japan

[21] Appl. No.: 09/093,616

[22] Filed: Jun. 9, 1998

[30] Foreign Application Priority Data

Jun. 12, 1997 [JP] Japan ................................. 9-155323

[51] Int. Cl.⁶ ............................................ B23K 11/25
[52] U.S. Cl. ................. 219/109; 219/91.1; 219/91.23; 219/117.1
[58] Field of Search .................. 219/56, 56.1, 56.21, 219/56.22, 58, 78.16, 91.1, 91.2, 91.23, 109, 117.1, 110

[56] References Cited

U.S. PATENT DOCUMENTS

| | | | |
|---|---|---|---|
| 3,352,994 | 11/1967 | Merchant | 219/91.2 X |
| 3,876,854 | 4/1975 | Andrew et al. | 219/91.1 |
| 4,577,086 | 3/1986 | Needham et al. | 219/117.1 |
| 4,922,072 | 5/1990 | Topel et al. | 219/56.1 |
| 5,645,738 | 7/1997 | Cecil | 219/59.1 X |
| 5,808,260 | 9/1998 | Asakura et al. | 219/56.22 |

FOREIGN PATENT DOCUMENTS

| | | | |
|---|---|---|---|
| 56-56781 | 5/1981 | Japan | 219/91.1 |
| 62-155977 | 10/1987 | Japan . | |
| 4-22584 | 1/1992 | Japan . | |
| 5-169272 | 7/1993 | Japan . | |
| 5-329661 | 12/1993 | Japan . | |

*Primary Examiner*—Gregory Mills
*Attorney, Agent, or Firm*—Morgan, Lewis & Bockius LLP

[57] ABSTRACT

A resistance welding method in which a welding current is passed through a welding portion of a material to be welded in a condition that the welding portion is put in between a pair of electrodes, so that the welding portion is fused and welded by use of the resistance heating caused by conduction of the welding current under pressure applied between the pair of electrodes, characterized by comprising the steps of: measuring a welding width of the welding portion by the width measurement unit; calculating a reference welding height of the welding portion from the measured welding width on the basis of a predetermined reference welding sectional area of the welding portion; passing the welding current through the welding portion until the height of the welding portion reaches the calculated reference welding height; and displaying current-conduction time from the start to end of conduction of the welding current on the display unit.

6 Claims, 11 Drawing Sheets

RESISTANCE WELDING METHOD AND APPARATUS USED IN THE METHOD

BACKGROUND OF THE INVENTION

The present invention relates to a resistance welding method in which, for example, a strand composed of twisted wires of one electric cable and a strand composed of twisted wires of the other electric cable are put on one another and pressed between a pair of electrodes, and a large current is passed through the strands for a short time to utilize resistance heating caused by the current conduction to thereby perform resistance welding, and an apparatus for use in such a method. Particularly, the present invention relates to a resistance welding method in which the resistance welding state of respective strands of the pair of electric cables is monitored so that the state of the respective strands before resistance welding can be detected as to whether the state is good or not, and an apparatus for use in such a method.

Figure 11:
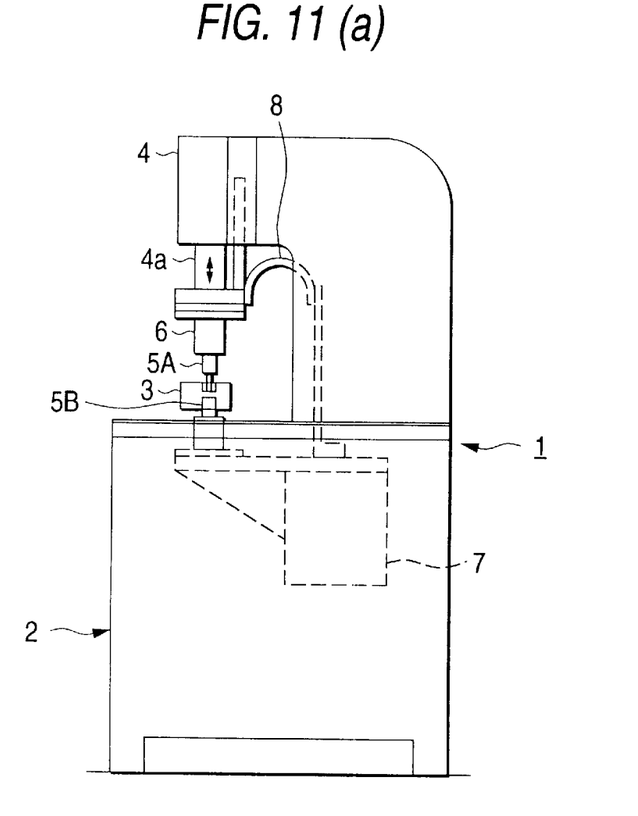
FIG. 11(a) is a side view of a conventional resistance welding apparatus.
FIG. 11(b) is a configuration view of a main part of the resistance welding apparatus.

As such a type of resistance apparatus, there is an apparatus of an AC thyristor system shown in FIG. 11(a). The resistance welding apparatus 1, which performs resistance welding on strands 31 and 31' put one on the other, as materials to be welded, of a pair of electrically insulating coated electric cables 30 and 30' (hereinafter simply referred to as "cables"), has a box-like apparatus body 2 which is substantially U-shaped in side view. A cable-setting jig 3 is disposed in the center of the apparatus body 2. An air cylinder 4 is attached to the upper front of the apparatus body 2. A pair of upper and lower electrodes 5A and 5B, which serve to pass a welding current through a welding portion of the strands 31 and 31' and also serve to apply a predetermined amount of pressure to the welding portion, are provided below the air cylinder 4, and the cable-setting jig 3 respectively.

The upper electrode 5A is connected to a piston rod 4a of the air cylinder 4 through an electrode holder 6 so as to move vertically. Further, the upper electrode 5A is also connected, through an ounce copper plate 8, to a welding transformer (electric source) 7 which serves to supply a welding current. Further, the lower electrode 5B is fixed to the center portion of the apparatus body 2 and connected to the welding transformer 7. The welding transformer 7 is connected to a welding timer 9 which serves to set the current value and current-conduction time of the welding current. An electromagnetic valve 4A of the air cylinder 4 is opened/closed on the basis of conduction-start and conduction-end signals obtained from the welding timer 9. Incidentally, each of the electrodes (electrode tips) 5A and 5B is constituted by a columnar chromium-copper matter 5a and a rectangular tungsten tip 5b.

Figure 12:
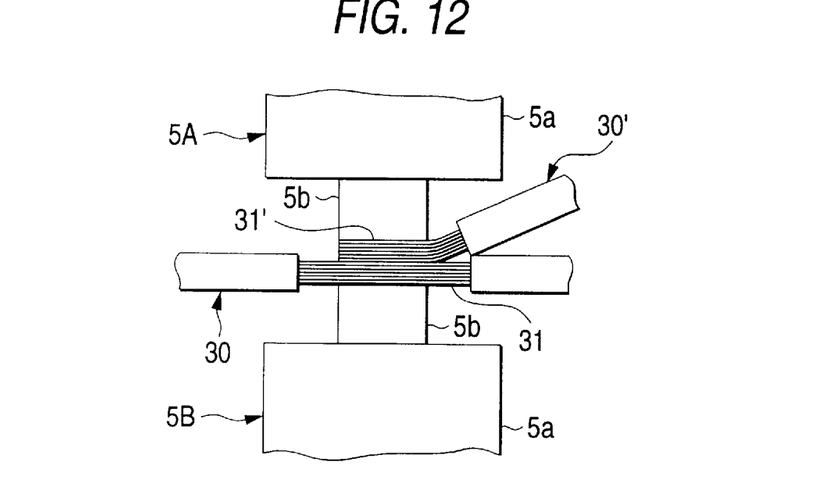
FIG. 12 is an explanatory view in the case where the strands of the pair of cables are welded between the pair of electrodes in the conventional resistance welding apparatus.
Figure 13:
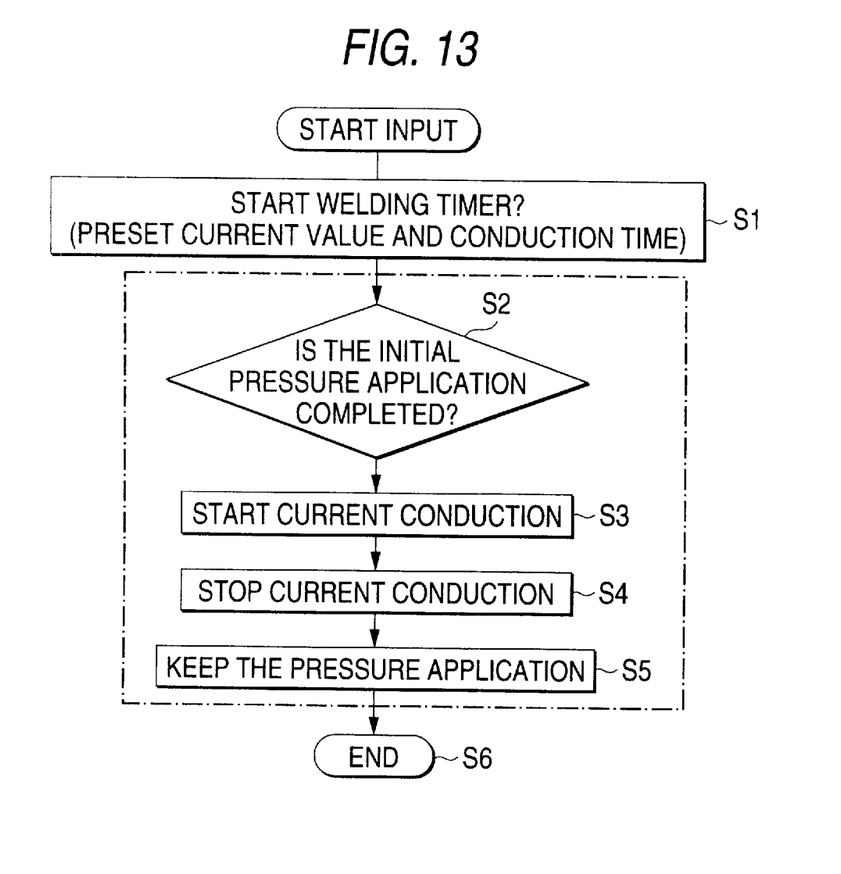
FIG. 13 is a flow chart for sequentially explaining the resistance welding of the strands of the pair of cables in the conventional resistance welding apparatus.

The step of performing resistance welding of the strands 31 and 31' of the pair of cables 30 and 30', which are put on one another by means of the AC thyristor system resistance welding apparatus 1 as shown in FIG. 12 will be described with reference to a flow chart shown in FIG. 13. First, after the exposed strands 31 and 31' of the pair of cables 30 and 30' are put in between the pair of electrodes 5A and 5B through the cable-setting jig 3, a start input switch 9A is turned on so that the welding timer 9 starts (step S1). As a result, the electromagnetic valve 4A is opened and the upper electrode 5A is moved down by the air cylinder 4. After completion of initial pressure application to the strands 31 and 31' between the pair of electrodes 5A and 5B (step S2), a welding current is passed between the pair of electrodes 5A and 5B alternately upward and downward by the welding transformer 7 (step S3). The welding current is passed for the current-conduction time which is set (fixed) in advance. Resistance heating caused by the conduction of the welding current is utilized so that the strands 31 and 31' is subjected to thermo-compression bonding. After resistance welding, the current conduction is stopped (step S4). Then, cooling is performed while the pressure application state between the pair of electrodes 5A and 5B is held for a predetermined time (step S5). The operation for the steps S2 to S5 is carried out automatically under the sequence control of the welding timer 9. Then, when the pressurized state is canceled, the resistance welding is completed (step S6). Incidentally, a similar technique is disclosed in Japanese Patent Unexamined Publication No. Hei. 5-329661.

Figure 14:
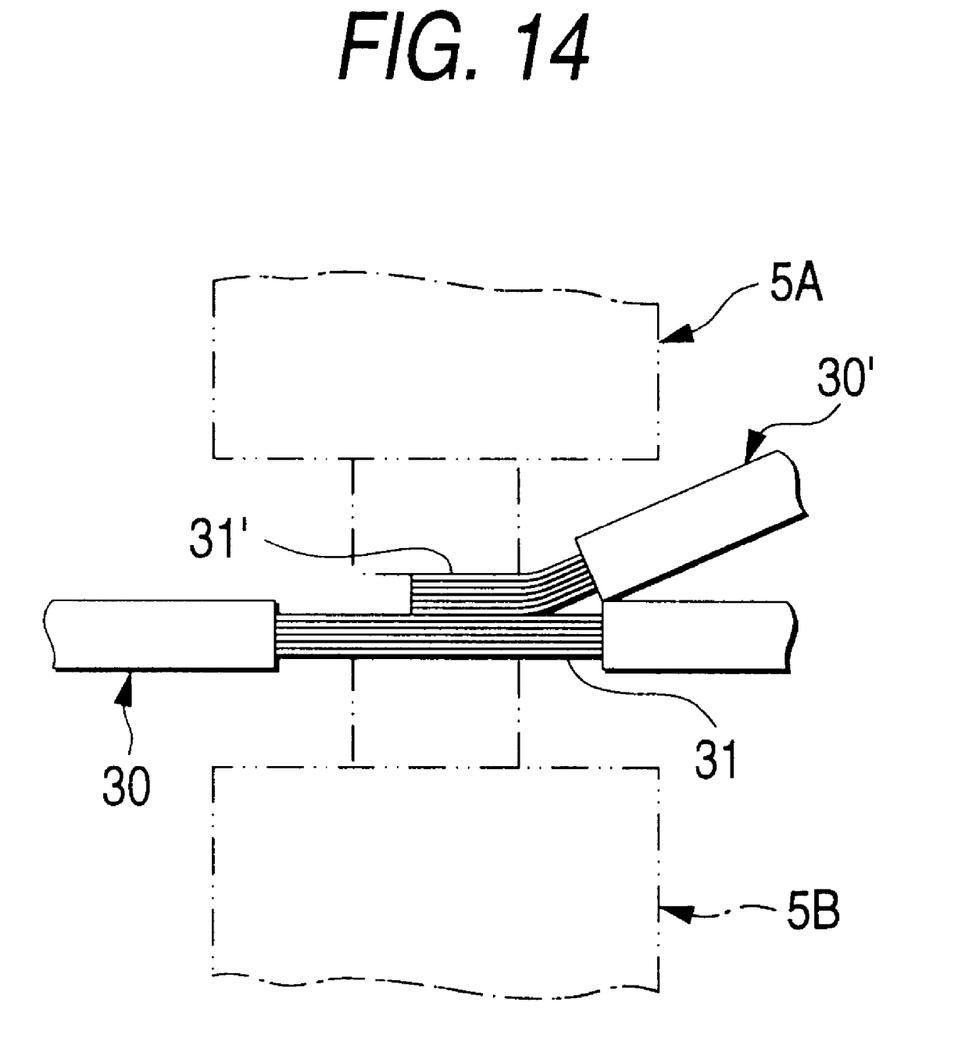
FIG. 14 is an explanatory view showing the case where the quantity of draw-in of the strand of one cable is short with respect to the strand of the other cable.

In the conventional resistance welding apparatus 1, however, the current-conduction time of the welding current was fixed to a predetermined value under the constant-current control by means of a combination of the welding transformer 7 and the welding timer 9. Accordingly, when the secondary resistance value of the pair of electrodes 5A and 5B changed, the amount of heating also changed. Accordingly, the welding state such as welding strength, or the like, of the strands 31 and 31' composed of twisted wires varied easily, so that it was difficult to stabilize welding quality. Particularly in the case where there was such a defect, before resistance welding, that the strand 31' of one cable 30' was drawn relative to the strand 31 of the other cable 30 as shown in FIG. 14, there was shortage or excess of the quantity of the strand of one cable relative to that of the other cable, there was breaking of the strand, there was a difference in cable size, etc., scattering was apt to be generated in the welding quality after resistance welding. To prevent such scattering in welding quality after resistance welding, the state of the strands 31 and 31' before resistance welding must be detected whether the state is good or not. It is, however, impossible to detect the state by a simple method and apparatus.

SUMMARY OF THE INVENTION

Therefore, the present invention is designed to solve the above problems and it is an object of the present invention to provide a resistance welding method in which various data are displayed until the point of time when the gap in a welding portion of a material to be welded becomes zero, the state of the welding portion of the material to be welded before resistance welding can be detected simply, so that welding quality can be stabilized, and to provide apparatus for use in such a method.

According to a first aspect of the invention, provided is a resistance welding method in which a welding current is passed through a welding portion of a material to be welded in a condition that pressure is applied to the welding portion between a pair of electrodes, so that resistance heating caused by conduction of the welding current is utilized to perform thermo-compression bonding of the welding portion to thereby perform resistance welding of the welding portion under pressure applied between the pair of electrodes, characterized by comprising the steps of: measuring a welding width of the welding portion; calculating a reference welding height of the welding portion from the measured welding width on the basis of a predetermined reference welding sectional area of the welding portion; passing the welding current through the welding portion until the height of the welding portion reaches the calculated reference welding height; and displaying current-conduction time from the start to end of conduction of the welding current.

According to a third aspect of the invention, the above method is characterized in that a voltage waveform concerning the quantity of sinking of the welding portion in a period from the start to end of conduction of the welding current is displayed.

According to a fifth aspect of the invention, the above method is characterized in that a waveform of inter-tip resistance between the pair of electrodes in a period from the start to end of conduction of the welding current is displayed.

In the above resistance welding methods, the current-conduction time, the voltage waveform in the quantity of sinking and the inter-tip resistance waveform until the point of time when the gap in the welding portion of the material to be welded becomes zero, are displayed respectively. That is, the state of the welding portion of the material to be welded is detected before resistance welding. Accordingly, the scattering in welding quality can be eliminated to thereby stabilize welding quality.

According to a second aspect of the invention, provided is a resistance welding apparatus comprising a pair of electrodes for passing a welding current through a welding portion of a material to be welded and for applying a predetermined amount of pressure to the welding portion, a welding timer for controlling current-conduction time of the welding current, and a welding transformer for supplying the welding current, whereby resistance heating caused by the conduction of the welding current is utilized to perform resistance welding on the welding portion of the material to be welded in a condition that pressure is applied onto the welding portion by the pair of electrodes, characterized in that the apparatus further comprises: a width measurement means for measuring a welding width of the welding portion; an arithmetic operation means for reversely calculating a reference welding height of the welding portion from the welding width measured by the width measurement means on the basis of a predetermined reference welding sectional area of the welding portion; a height detection means for making detection as to whether a height of the welding portion has reached the reference welding height or not; an interface for controlling the welding timer to stop the conduction of the welding current when the reference welding height of the welding portion is detected by the height detection means; and a display means for displaying current-conduction time from start to end of the conduction of the welding current.

According to a fourth aspect of the invention, the above apparatus is characterized in that the apparatus comprises a display means for displaying a voltage waveform concerning the quantity of sinking of the welding portion in a period from the start to end of conduction of the welding current.

According to a sixth aspect of the invention, the above apparatus is characterized in that the apparatus comprises an inter-tip resistance arithmetic operation means for calculating inter-tip resistance between the pair of electrodes in a period from the start to end of conduction of the welding current; and a display means for displaying a waveform of the inter-tip resistance calculated by the inter-tip resistance arithmetic operation means.

In these resistance welding methods, the current-conduction time, the voltage waveform in the quantity of sinking and the inter-tip resistance waveform until the point of time when the gap in the welding portion of the material to be welded becomes zero, are displayed on the display means. That is, the state of the welding portion of the material to be welded is detected before resistance welding. Accordingly, the scattering in welding quality can be eliminated to thereby stabilize welding quality.

DETAILED DESCRIPTION OF THE INVENTION

Preferred embodiments of the present invention will be described below with reference to the drawings.

Figure 1:
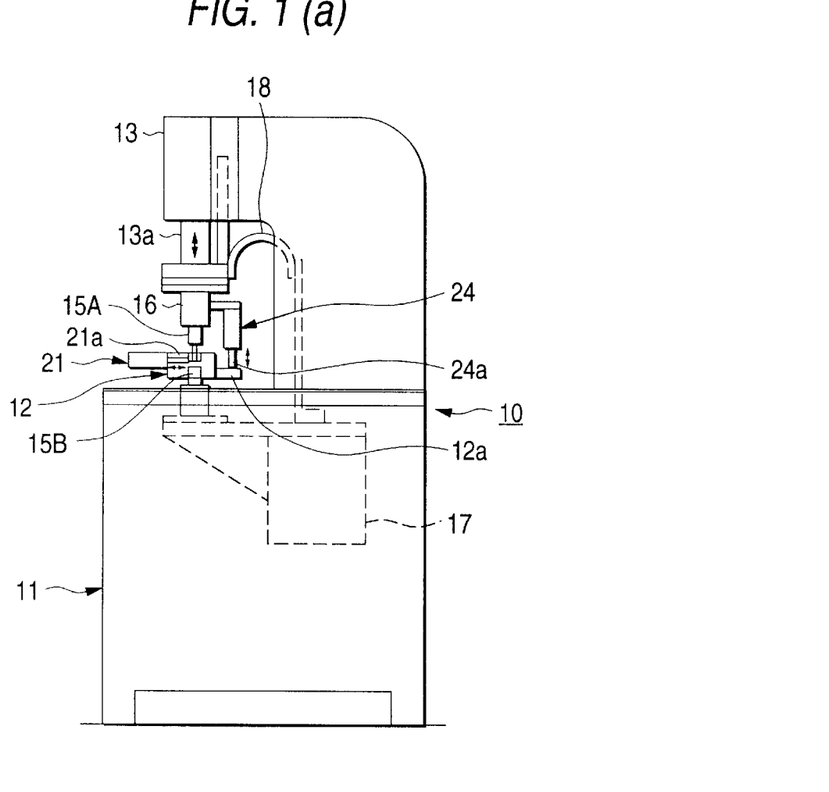
FIG. 1(a) is a side view showing a resistance welding apparatus in a mode for carrying out the present invention.
FIG. 1(b) is a configuration view of a main part of the resistance welding apparatus.
Figure 2:
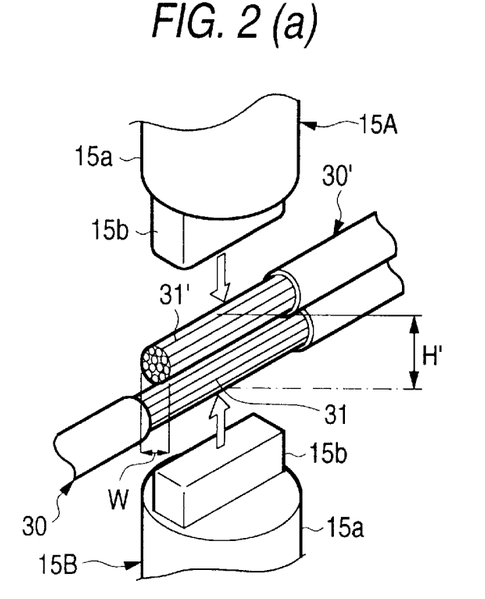
FIG. 2(a) is a perspective view showing a pair of cables to be welded by the resistance welding apparatus.
FIG. 2(b) is an explanatory view showing the relation in lamination between a pair of electrodes and the pair of cables at the time of welding.

FIG. 1(a) is a side view showing a resistance welding apparatus in an embodiment of the present invention; FIG, 1(b) is a configuration view of a main part of the resistance welding apparatus; FIG. 2(a) is a perspective view showing a pair of cables which are subjected to resistance welding by the resistance welding apparatus; and FIG. 2(b) is an explanatory view showing the relation of stack between the pair of electrodes and the pair of cables at the time of the resistance welding.

The resistance welding apparatus 10 shown in FIG, 1(a) is an apparatus of an AC thyristor system (a system in which thyristors are used as electric source switches for performing welding current regulation continuously by changing the firing phase of the thyristors. The resistance welding apparatus 10 serves to perform resistance welding on strands 31 and 31' composed of twisted wires of a pair of cables 30 and 30' which are put on one another as materials to be welded. The resistance welding apparatus 10 has a box-like apparatus body 11 which is substantially U-shaped in side view. A cable-setting jig 12 is disposed in the center of the apparatus body 11. An air cylinder (drive means) 13 is attached to the upper front of the apparatus body 11. A pair of upper and lower electrodes 15A and 15B, which serve to pass a welding current through a welding portion of the strands 31 and 31' and also serve to apply a predetermined amount of pressure to the welding portion, are provided below the cable-setting jig 12 and below the air cylinder 13. Each of the electrodes (electrode tips) 15A and 15B is constituted by a columnar chromium-copper body 15a and a rectangular tungsten tip 15b.

The upper electrode 15A is connected to a piston rod 13a of the air cylinder 13 through an electrode holder 16 so as to move vertically. Further, the upper electrode 15A is also connected, through an ounce copper plate 18, to a welding transformer (electric source) 17 which serves to supply a welding current. On the other hand, the lower electrode 15B is fixed to the center portion of the apparatus body 11 and connected to the welding transformer 17. Further, a welding timer 19 which controls the current-conduction time of the welding current is connected to the welding transformer 17. A sequencer (interface) 20 having a sequence control circuit not shown, or the like, is connected to the welding timer 19. Not only an electromagnetic valve 14 of the air cylinder 13 is opened/closed but also the welding timer 19 is controlled (to start/end the current conduction) on the basis of conduction-start and conduction-end signals obtained from the sequencer 20. Incidentally, the pressure applied between the pair of electrodes 15A and 15B by the piston rod 13a of the air cylinder 13 is set to be, for example, in a range of from about 100 to about 200 kgf. Further, in order to obtain a low voltage (for example, about 2 V) and a large current (for example, in a range of from 4000 to 6000 A), the welding transformer 17 has a primary winding, a secondary winding, or the like, which are not shown.

Figure 3:
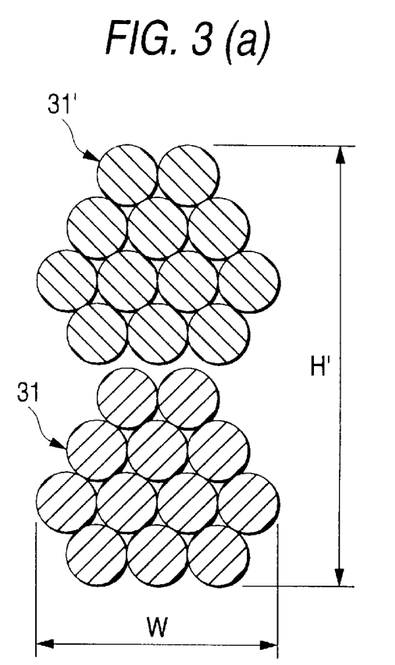
FIG. 3(a) is an explanatory view showing a state in which strands of the pair of cables have not been welded yet.
FIG. 3(b) is an explanatory view showing a reference welding sectional area indicating a state in which the strands are welded.

As shown in FIG, 1(a), a width displacement sensor (width measurement means) 21 for measuring the welding width W of the welding portion of the strands 31 and 31' is provided in the cable-setting jig 12. As shown in FIGS. 3(a) and 3(b), an arithmetic operation portion (arithmetic operation means) 22 having an arithmetic operation means not shown, or the like, is connected to the sequencer 20 for reversely calculating (S W =H) to obtain the reference welding height H of the welding portion from a predetermined reference welding sectional area S of the welding portion on the basis of the welding width W of the welding portion of the strands 31 and 31' measured by the width displacement sensor 21. Further, a display unit (display means) 23 is provided in the arithmetic operation portion 22 for displaying the current-conduction time from start to end of the conduction of the welding current, or the like. Furthermore, a height displacement sensor (height detection means) 24 is provided in the electrode holder 16 for making detection as to whether the height H' of the welding portion has reached the reference welding height H or not so that the welding timer 19 is controlled by the sequencer 20 to stop the conduction of the welding current when the reference welding height H of the welding portion is detected by the height displacement sensor 24.

The width displacement sensor 21 has a probe 21a which moves horizontally so that the welding width W of the welding portion of the strands 31 and 31' is measured on the basis of the moving distance of the probe 21a. Further, the display unit 23 has a liquid crystal panel not shown, or the like, so that information of the current-conduction time from the start to end of conduction of the welding current, or the like, is displayed on the liquid crystal panel. Further, the height displacement sensor 24 has a probe 24a which moves vertically and which comes into contact with a reference plate portion 12a of the cable-setting jig 12 so that whether the height H' of the welding portion of the strands 31 and 31' has reached the reference welding height H or not is detected on the basis of the moving distance of the probe 24a. Incidentally, the welding width W of the welding portion, the reference welding sectional area S and the reference welding height H vary correspondingly to the subject of welding.

Figure 4:
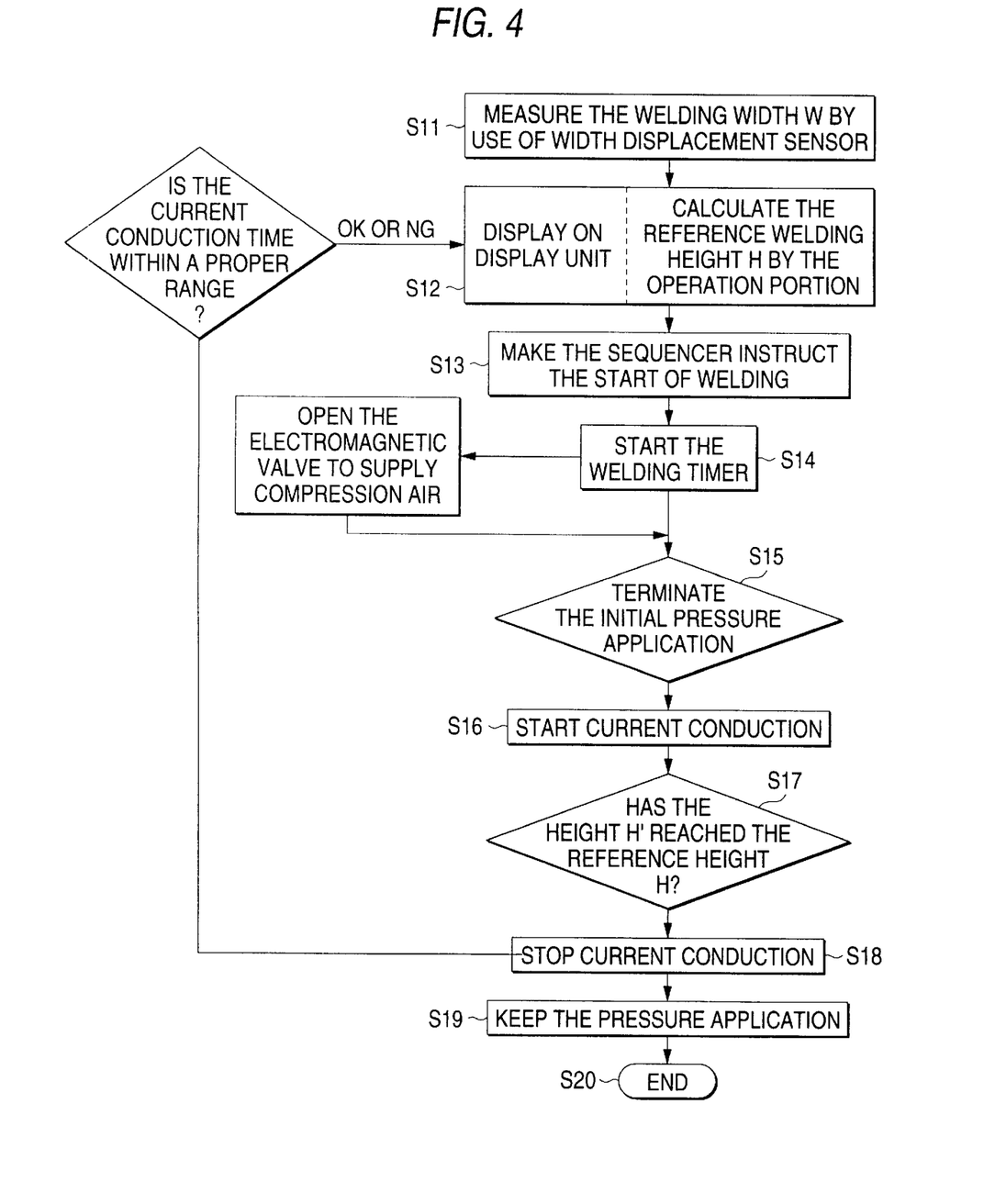
FIG. 4 is a flow chart for sequentially explaining the resistance welding of the strands of the pair of cables by the resistance welding apparatus.

The step of performing resistance welding on the strands 31 and 31' composed of twisted wires of the pair of cables 30 and 30' which are put on one another, by use of the AC thyristor system resistance welding apparatus 10 in the aforementioned mode will be described below with reference to a flow chart shown in FIG. 4. First, as shown in FIG. 2(b), after the exposed strands 31 and 31' of the pair of cables 30 and 30' are set in the cable-setting jig 12 so as to be put on one another, the welding width W of the welding portion of the strands 31 and 31' is measured (step S11). When the reference welding height H of the welding portion is calculated by the arithmetic operation portion 22 on the basis of the reference welding sectional area S of the welding portion of the strands 31 and 31' predetermined by the measured welding width W (step S12), the sequencer 20 issues an instruction to input the welding start (step S13). As a result, the welding timer 19 starts (step S14). At the same time, the electromagnetic valve 14 connected to a compression air source not shown is opened, so that the upper electrode 15A is moved down. After completion of initial pressure application to the strands 31 and 31' between the pair of electrodes 15A and 15B (step S15), a welding current is passed between the pair of electrodes 15A and 15B alternately upward and downward by the welding transformer 17 (step S16). Resistance heating caused by the conduction of the welding current is utilized so that the strands 31 and 31' is subjected to thermo-compression bonding (or diffusion bonding) by using the resistance heating.

Figure 5:
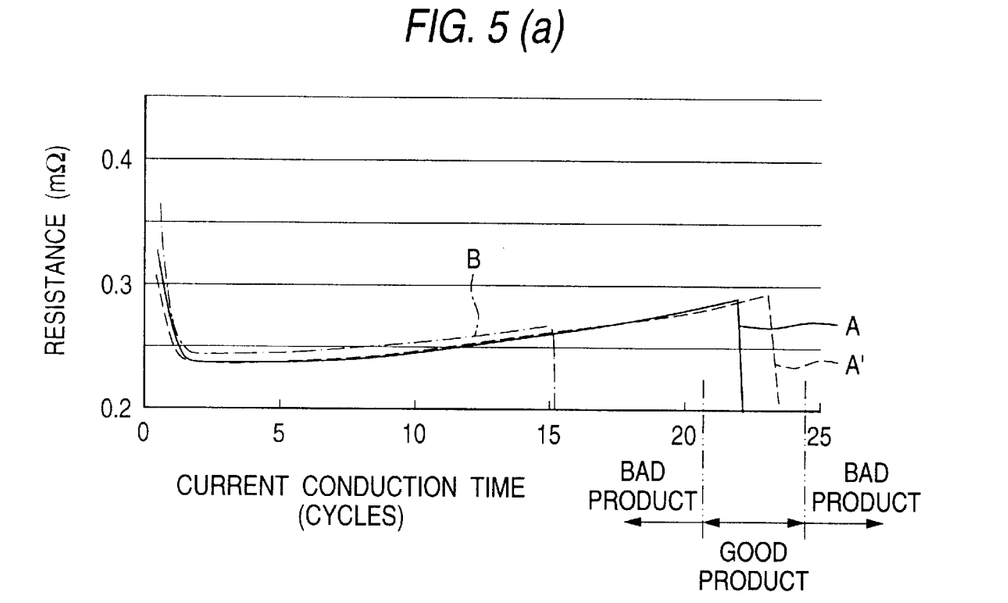
FIG. 5(a) is an explanatory graph of the current-conduction time from the start to end of conduction in the flow chart.
FIG. 5(b) is a characteristic graph showing the relation between adhesive force (kgf) between wires of the strands and the displacement (V) of the inter-electrode voltage in the case where the current-conduction time of the welding current is changed by the resistance welding apparatus.
FIG. 5(c) is a characteristic graph showing the relation between adhesive force (kgf) between wires of the strands and the displacement (V) of the inter-electrode voltage in the case where the current-conduction time of the welding current is fixed by the conventional resistance welding apparatus.

When the height displacement sensor 24 detects the fact that the height H' of the welding portion of the strands 31 and 31' has reached the reference welding height H (H'=H) (step S17), the sequencer 20 stops the conduction of the welding current through the welding timer 19 (step S18). That is, the welding current is passed continuously to perform resistance welding of the strands 31 and 31' until the height displacement sensor 24 detects the fact that the height H' of the welding portion of the strands 31 and 31' has reached the reference welding height H. The current-conduction time from the start to end of conduction of the welding current is displayed on the display unit 23 as shown in FIG. 5(a). Then, cooling is performed while the state of pressure between the pair of electrodes 15A and 15B is held for a predetermined time (step S19). Then, the state of pressure is canceled to terminate the resistance welding (step S20).

As shown in FIG. 5(a), whether the current-conduction time from the start to end of conduction of the welding current until the height H' of the welding portion of the strands 31 and 31' reaches the reference welding height H calculated on the basis of the reference welding sectional area S (until the point of time when the gap between the strands 31 and 31' becomes zero) is in an appropriate range or not, is displayed on the display unit 23. That is, when the current-conduction time from the start to end of conduction of the welding current is in a range of from 21 cycles represented by the solid line A to 24 cycles represented by the broken line A' shown in FIG. 5(a), the welding is regarded to be good. When the current-conduction time is not larger than 21 cycles as represented by the dot-and-dash line B or not smaller than 24, the welding is regarded to be bad (the state of the strands 31 and 31' before resistance welding is, for example, the state of shortage of the quantity of cable draw-in, or the like, as shown in FIG. 14). As described above, the state of the welding portion of the strands 31 and 31' before resistance welding can be detected easily when the current-conduction time from the start to end of conduction of the welding current is compared with the reference time (the state of good welding). Accordingly, scattering in welding quality can be eliminated, so that welding quality can be improved.

Further, the experimental data are shown in FIG. 5(b) about the case where the conduction of the welding current was performed until the height H' of the welding portion of the strands 31 and 31' reached the reference welding height H, for example, in the condition in which the welding width W of the welding portion of the strands 31 and 31' of the pair of cables 30 and 30' was 2.5 mm, the reference welding sectional area S was 7.5 mm², the reference welding height H was 3.0 mm, the height H' of the welding portion before welding was 5.0 mm, the pressure applied to the pair of electrodes 15A and 15B was 150 kgf, and the welding current was 4000 A. As a result, the gap between the strands became zero in the welding portion of the strands 31 and 31' subjected to resistance welding as shown in FIG. 3(b), so that the strands 31 and 31' are brought into a state in which the peripheries of the strands are closely connected and welded to each other (the percentage of the gap between the strands 31 and 31' is zero). Accordingly, the adhesive force between the strands is stabilized as shown in FIG. 5(b) regardless of the alignment of the strands 31 and 31'. This is clear if FIG. 5(b) is compared with FIG. 5(c) which shows experimental data in the conventional case where the current-conduction time from the start to end of conduction of the welding current is fixed to a predetermined time under constant-current control.

Figure 6:
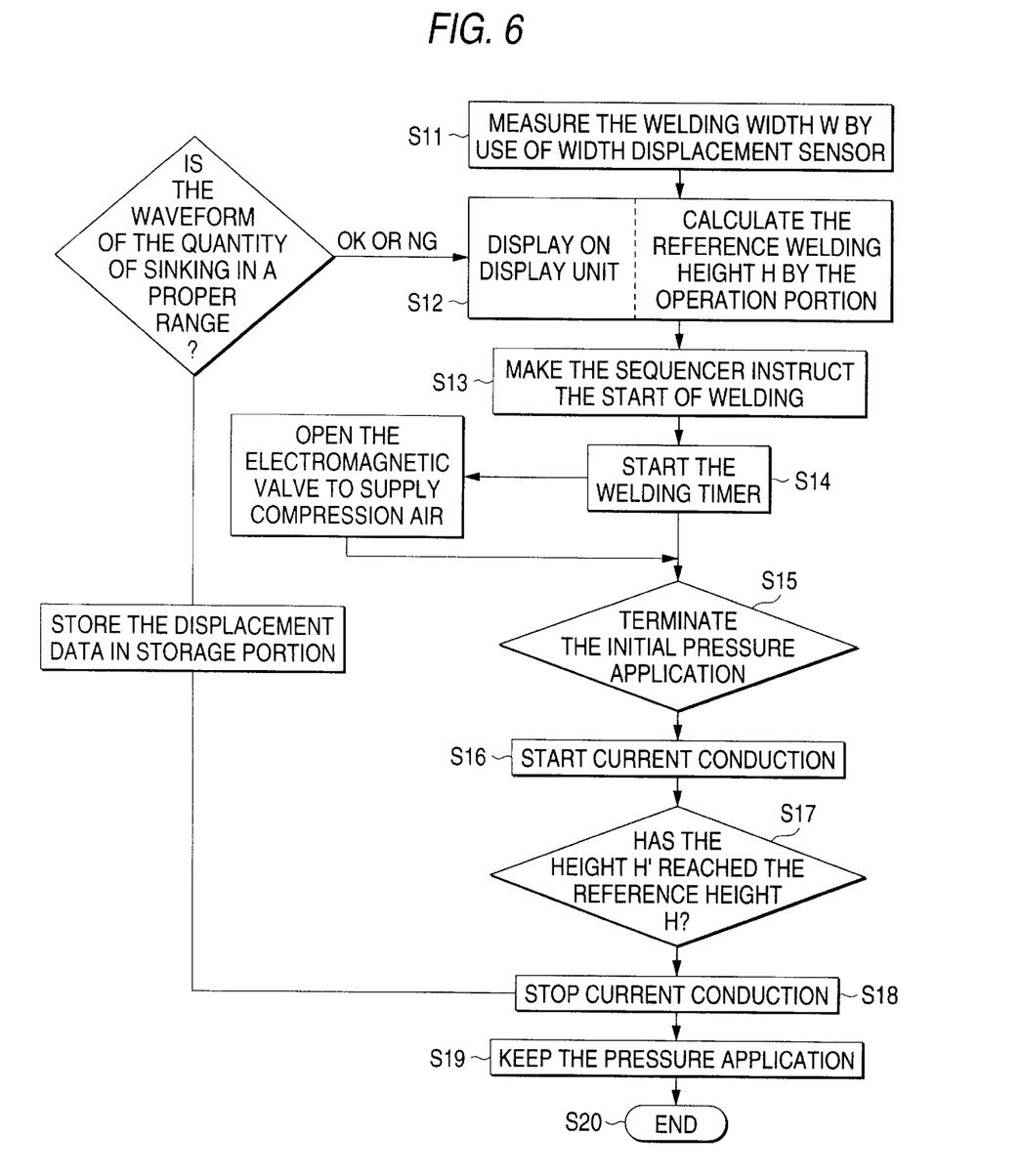
FIG. 6 is another flow chart for sequentially explaining the resistance welding of the strands of the pair of cables by the resistance welding apparatus.
Figure 7:
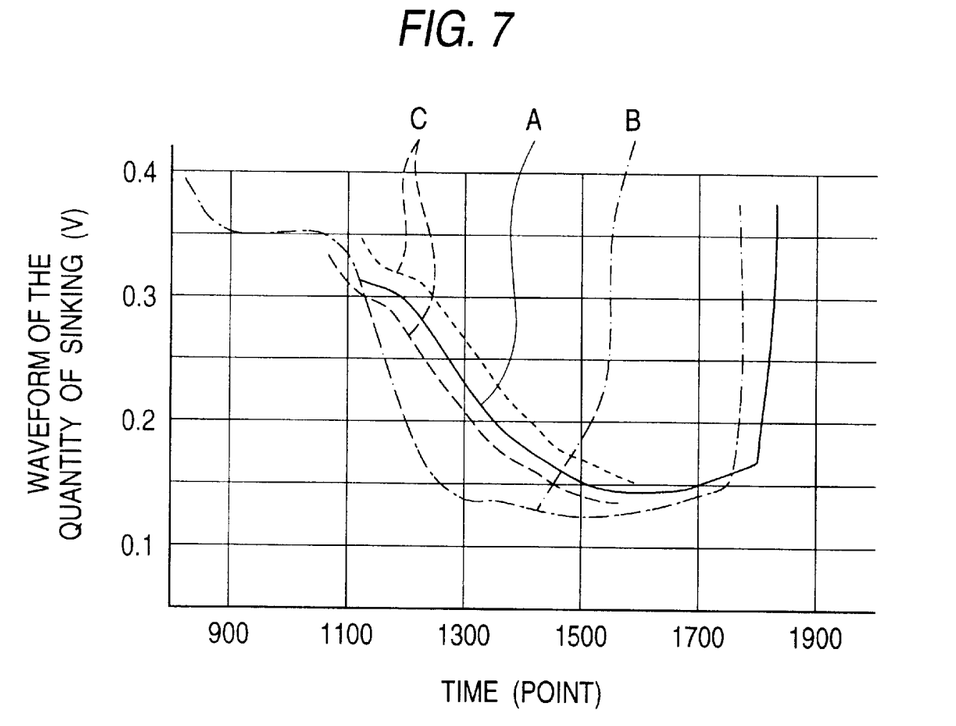
FIG. 7 is an explanatory graph of the voltage waveform of the quantity of the welding portion sunk in the period from the start to end of conduction according to the other flow chart.

FIG. 6 shows a flow chart of another mode for carrying out the present invention; and FIG. 7 shows an example of the voltage waveform of the quantity of sinking of the welding portion displayed on the display unit in the flow chart.

In the other mode shown in FIGS. 6 and 7, in the step S18 in which the sequencer 20 stops the conduction of the welding current in the strands 31 and 31' through the welding timer 19, the displacement data of the voltage output of the height displacement sensor 24 (the data of the waveform of displacement expressed by voltage value) in a period from the start to end of conduction of the welding current as obtained by time sampling of the height displacement sensor 24 are stored in a storage portion not shown so that the voltage waveform of the quantity of sinking (H'–H) of the welding portion in the period from the start to end of conduction of the welding current is displayed on the display unit 23 on the basis of the stored displacement data. When the voltage waveform of the quantity of sinking in the period from the start to end of conduction of the welding current is in a reference waveform region C which shows the good welding state as represented by the solid line A in FIG. 7, the welding is regarded to be good. When the voltage waveform is out of the reference waveform region C as represented by the dot-and-dash line B, the welding is regarded to be bad (the state of the strands 31 and 31' before resistance welding is, for example, such a state of shortage of the quantity of cable draw-in as shown in FIG. 14). As described above, the state of the welding portion of the strands 31 and 31' before resistance welding can be detected easily when the voltage waveform A or B of the quantity of sinking of the welding portion in the period from the start to end of conduction of the welding current as displayed on the display unit 23 is compared with the reference waveform C. Accordingly, scattering in welding quality can be eliminated to thereby improve the welding quality. Incidentally, in FIG. 7, the x axis shows the time axis of 2 msec/point when, for example, the sampling frequency is 500 Hz.

Figure 8:
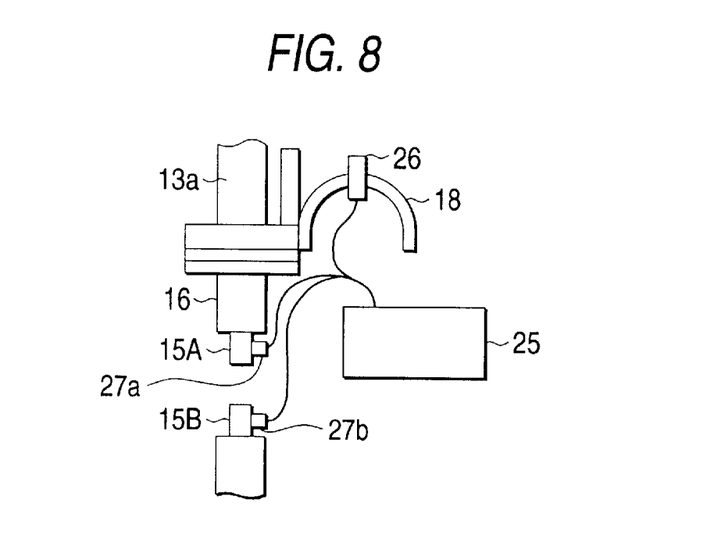
FIG. 8 is a configuration view of another main part of the resistance welding apparatus.
Figure 9:
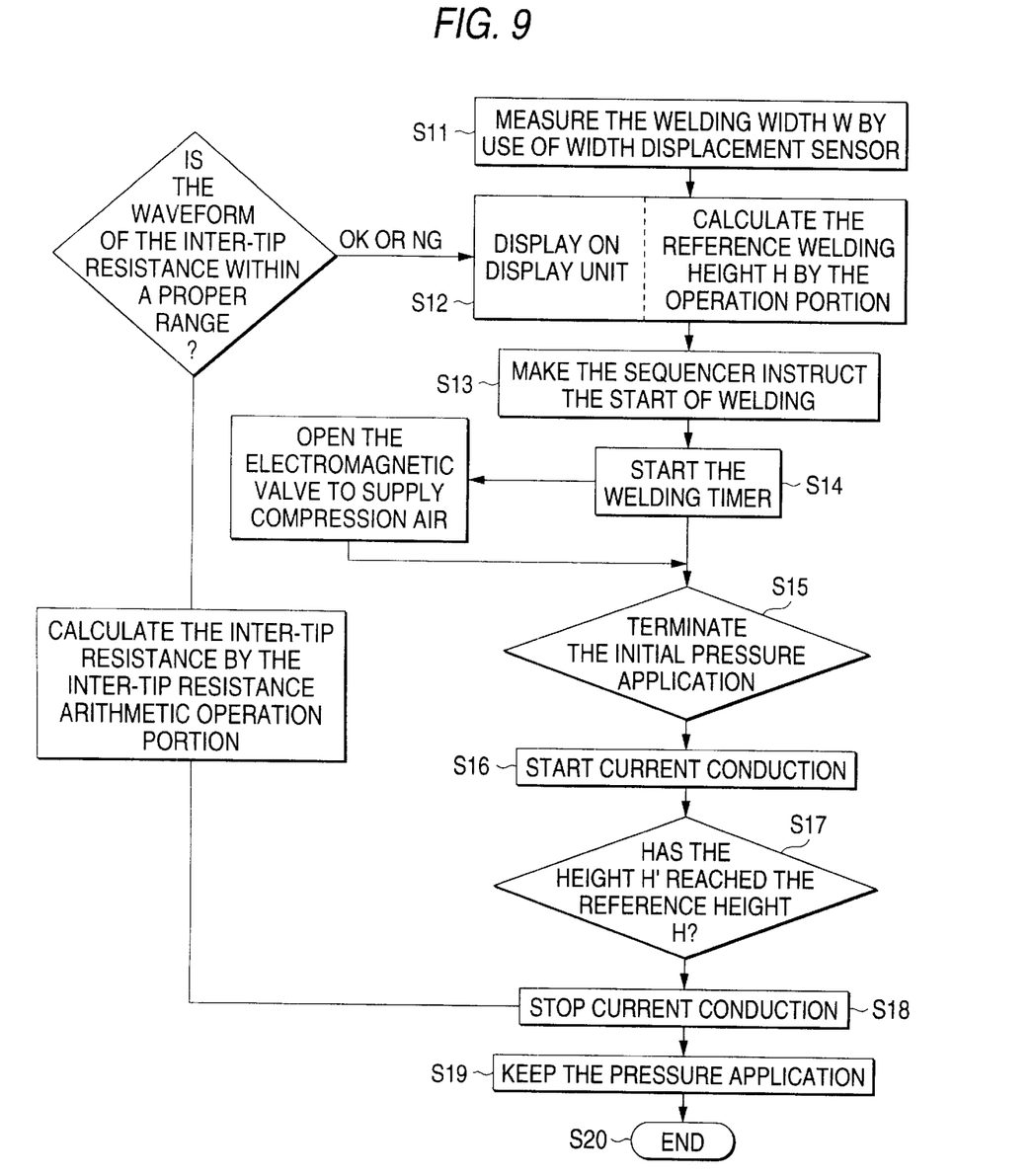
FIG. 9 is a further flow chart for sequentially explaining the resistance welding of the strands of the pair of cables by the resistance welding apparatus.
Figure 10:
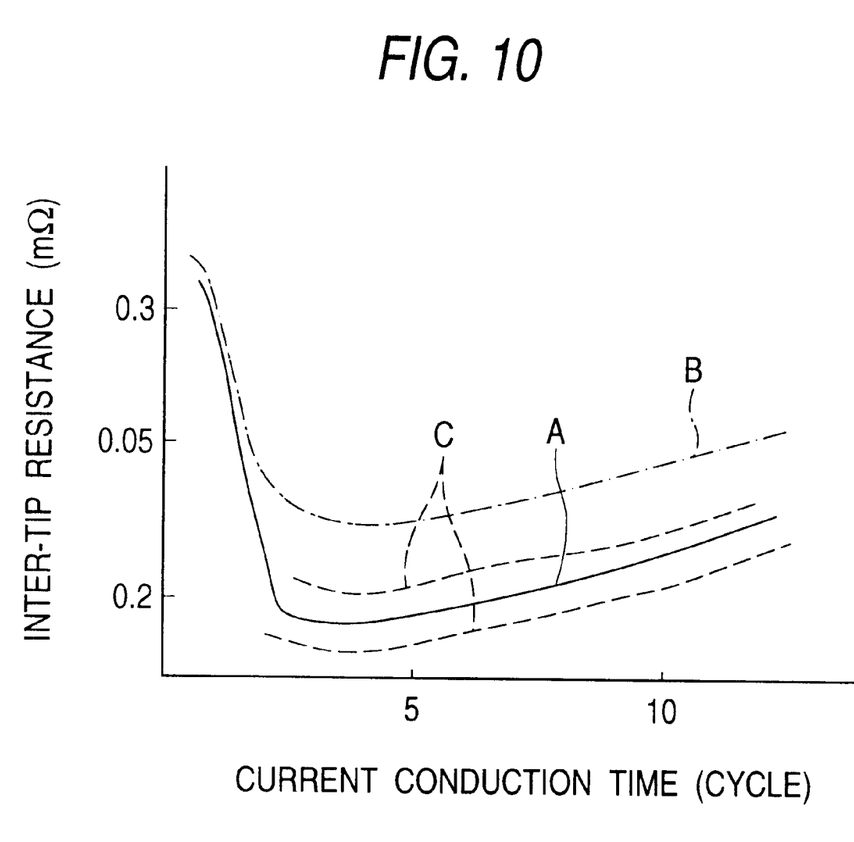
FIG. 10 is an explanatory graph of the inter-tip resistance waveform in a period from the start to end of conduction according to the further flow chart.

FIG. 8 shows a configuration view of another main part of the resistance welding apparatus 10; FIG. 9 shows a flow chart of another embodiment for carrying out the invention; and FIG. 10 shows an example of inter-tip resistance waveform displayed on the display unit in the flow chart.

As shown in FIG. 8, an inter-tip resistance arithmetic operation portion (inter-tip resistance arithmetic operation means) 25 for calculating inter-tip resistance between the pair of electrodes 15A and 15B in the period from the start to end of conduction of the welding current in the strands 31 and 31' is provided between the ounce copper plate 18 and the pair of electrodes 15A, 15B in the resistance welding apparatus 10. The inter-tip resistance arithmetic operation portion 25 is connected to a current detection portion 26 of the ounce copper plate 18 and to inter-tip voltage detection portions 27a and 27b of the pair of electrodes 15A and 15B so that inter-tip resistance is calculated on the basis of the inter-tip voltage between the pair of electrodes 15A and 15B and the current value under current conduction by means of time sampling.

Then, in the step S18 in which the sequencer 20 shown in FIG. 9 stops the conduction of the welding current in the strands 31 and 31' through the welding timer 19, the inter-tip resistance waveform in the period from the start to end of conduction of the welding current in the strands 31 and 31' as calculated by the inter-tip resistance arithmetic operation portion 25 is displayed on the display unit 23. When the bottom value side of the inter-tip resistance waveform in the period from the start to end of conduction of the welding current is in a reference waveform region C, which shows the good welding state as represented by the solid line A in FIG. 10, the welding is regarded to be good. When the bottom value side is out of the reference waveform region C as represented by the dot-and-dash line B, the welding is regarded to be bad (the state of the strands 31 and 31' before resistance welding is, for example, such a state of shortage of the quantity of cable draw-in as shown in FIG. 14). As described above, the state of the welding portion of the strands 31 and 31' before resistance welding can be detected easily when the inter-tip resistance waveform A or B in the period from the start to end of conduction of the welding current as displayed on the display unit 23 is compared with the reference waveform C. Accordingly, scattering in welding quality can be eliminated, so that welding quality can be improved.

As described above, in the resistance welding method of the first, third, or fifth aspect of the invention, the current-conduction time, the voltage waveform in the quantity of sinking, and the voltage waveform of the electrode inter-tip resistance are displayed respectively, until the point of time when the gap in the welding portion of the material to be welded becomes zero. Accordingly, the state of the welding portion of the material to be welded is detected easily before resistance welding. Accordingly, the scattering in welding quality can be eliminated to thereby stabilize welding quality.

In the resistance welding apparatuses according to the second, fourth, or sixth aspect of the invention, the current-conduction time, the voltage waveform in the quantity of sinking and the voltage waveform of the electrode inter-tip resistance are displayed respectively on the display means, until the point of time when the gap in the welding portion of the material to be welded becomes zero. Accordingly, the state of the welding portion of the material to be welded is detected easily before resistance welding. Accordingly, the scattering in welding quality can be eliminated to thereby stabilize welding quality.

What is claimed is:

1. A resistance welding method in which a welding current is passed through a welding portion of a material to be welded in a condition that pressure is applied to said welding portion between a pair of electrodes, so that resistance heating caused by conduction of said welding current is utilized to perform thermo-compression bonding of said welding portion to thereby perform resistance welding of said welding portion under pressure applied between said pair of electrodes, the resistance welding method comprising the steps of:

measuring a welding width of said welding portion;

calculating a reference welding height of said welding portion from the measured welding width on the basis of a predetermined reference welding sectional area of said welding portion;

passing the welding current through said welding portion until the height of said welding portion reaches said calculated reference welding height; and displaying current-conduction time from the start to end of conduction of said welding current.

2. A resistance welding apparatus comprising a pair of electrodes for passing a welding current through a welding portion of a material to be welded and for applying a predetermined amount of pressure to said welding portion, a welding timer for controlling current-conduction time of said welding current, and a welding transformer for supplying said welding current, whereby resistance heating caused by the conduction of said welding current is utilized to perform resistance welding on said welding portion of said material to be welded in a condition that pressure is applied onto said welding portion by said pair of electrodes, the resistance welding apparatus comprising:

a width measurement means for measuring a welding width of said welding portion;

an arithmetic operation means for reversely calculating a reference welding height of said welding portion from the welding width measured by said width measurement means on the basis of a predetermined reference welding sectional area of said welding portion;

a height detection means for making detection as to whether a height of said welding portion has reached said reference welding height or not;

an interface for controlling said welding timer to stop the conduction of said welding current when said reference welding height of said welding portion is detected by said height detection means; and a display means for displaying current-conduction time from start to end of the conduction of said welding current.

3. A resistance welding method in which a welding current is passed through a welding portion of a material to be welded in a condition that pressure is applied to said welding portion between a pair of electrodes, so that resistance heating caused by conduction of said welding current is utilized to perform thermo-compression bonding of said welding portion to thereby perform resistance welding of said welding portion under pressure applied between said pair of electrodes, the resistance welding method comprising the steps of:

measuring a welding width of said welding portion;

calculating a reference welding height of said welding portion from the measured welding width on the basis of a predetermined reference welding sectional area of said welding portion;

passing the welding current through said welding portion until the height of said welding portion reaches said calculated reference welding height; and displaying a voltage waveform concerning the quantity of sinking of said welding portion in a period from the start to end of conduction of said welding current.

4. A resistance welding apparatus comprising a pair of electrodes for passing a welding current through a welding portion of a material to be welded and for applying a predetermined amount of pressure to said welding portion, a welding timer for controlling current-conduction time of said welding current, and a welding transformer for supplying said welding current, whereby resistance heating caused by the conduction of said welding current is utilized to perform resistance welding on said welding portion of said material to be welded in a condition that pressure is applied onto said welding portion by said pair of electrodes, the resistance welding apparatus further comprising:

a width measurement means for measuring a welding width of said welding portion;

an arithmetic operation means for reversely calculating a reference welding height of said welding portion from the welding width measured by said width measurement means on the basis of a predetermined reference welding sectional area of said welding portion;

a height detection means for making detection as to whether a height of said welding portion has reached said reference welding height or not;

an interface for controlling said welding timer to stop the conduction of said welding current when said reference welding height of said welding portion is detected by said height detection means; and a display means for displaying a voltage waveform concerning the quantity of sinking of said welding portion in a period from the start to end of conduction of said welding current.

5. A resistance welding method in which a welding current is passed through a welding portion of a material to be welded in a condition that pressure is applied to said welding portion between a pair of electrodes, so that resistance heating caused by conduction of said welding current is utilized to perform thermo-compression bonding of said welding portion to thereby perform resistance welding of said welding portion under pressure applied between said pair of electrodes, the resistance welding method comprising the steps of:

measuring a welding width of said welding portion;

calculating a reference welding height of said welding portion from the measured welding width on the basis of a predetermined reference welding sectional area of said welding portion;

passing the welding current through said welding portion until the height of said welding portion reaches said calculated reference welding height; and     displaying a waveform of inter-tip resistance between said pair of electrodes in a period from the start to end of conduction of said welding current.

6. A resistance welding apparatus comprising a pair of electrodes for passing a welding current through a welding portion of a material to be welded and for applying a predetermined amount of pressure to said welding portion, a welding timer for controlling current-conduction time of said welding current, and a welding transformer for supplying said welding current, whereby resistance heating caused by the conduction of said welding current is utilized to perform resistance welding on said welding portion of said material to be welded in a condition that pressure is applied onto said welding portion by said pair of electrodes, the resistance welding apparatus further comprising:

a width measurement means for measuring a welding width of said welding portion;

an arithmetic operation means for reversely calculating a reference welding height of said welding portion from the welding width measured by said width measurement means on the basis of a predetermined reference welding sectional area of said welding portion;

a height detection means for making detection as to whether a height of said welding portion has reached said reference welding height or not;

an interface for controlling said welding timer to stop the conduction of said welding current when said reference welding height of said welding portion is detected by said height detection means;

an inter-tip resistance arithmetic operation means for calculating inter-tip resistance between said pair of electrodes in a period from the start to end of conduction of said welding current; and     a display means for displaying a waveform of said inter-tip resistance calculated by said inter-tip resistance arithmetic operation means.

\* \* \* \* \*